United States Patent [19]

Hamar et al.

[11] Patent Number: 5,302,833
[45] Date of Patent: Apr. 12, 1994

[54] ROTATIONAL ORIENTATION SENSOR FOR LASER ALIGNMENT CONTROL SYSTEM

[75] Inventors: Martin R. Hamar, Wilton; Carlos Araujo, Danbury, both of Conn.

[73] Assignee: Hamar Laser Instrument, Inc., Conn.

[21] Appl. No.: 746,470

[22] Filed: Aug. 16, 1991

Related U.S. Application Data

[63] Continuation-in-part of Ser. No. 427,759, Oct. 26, 1989.
[51] Int. Cl.$^5$ .............................................. G01V 9/04
[52] U.S. Cl. ................... 250/561; 250/231.10; 356/141
[58] Field of Search ............... 250/561, 231.1, 206.1, 250/206.2, 201.1; 356/376, 383, 399, 400, 401, 141, 152; 33/286, 234

[56] References Cited

U.S. PATENT DOCUMENTS 5,098,185  3/1992  Watanabe et al. ............... 356/141
5,148,232  9/1992  Duey et al. ..................... 356/152

Primary Examiner—David C. Nelms
Assistant Examiner—Que T. Le
Attorney, Agent, or Firm—Anthony J. Casella; Gerald E. Hespos

[57] ABSTRACT

A laser alignment control system is provided for aligning a rotational portion of a machine tool to a master part. The system includes a laser emitter that is mountable to one of the components being aligned and a photosensitive target mountable to the other components. The system further includes a data acquisition subsystem for receiving signals from the target and calculating alignment errors and required corrections for the system. The alignment procedure requires rotating the target for the laser emitter in the rotating tool holder or the master part. The target and/or the laser emitter are provided with a rotational orientation sensor operatively connected to the data acquisition subsystem and operative to produce signals identifying the rotational orientation of the target and/or laser emitter.

20 Claims, 10 Drawing Sheets (1) LINE: #1 BLOCK LINE
(2) STATION: #23
(3) HEAD: 3 RIGHT
(4) TARJET: #1T-261
(5) ORIENTATION: 12-6 O'CLOCK
(6) *CONTINUE*

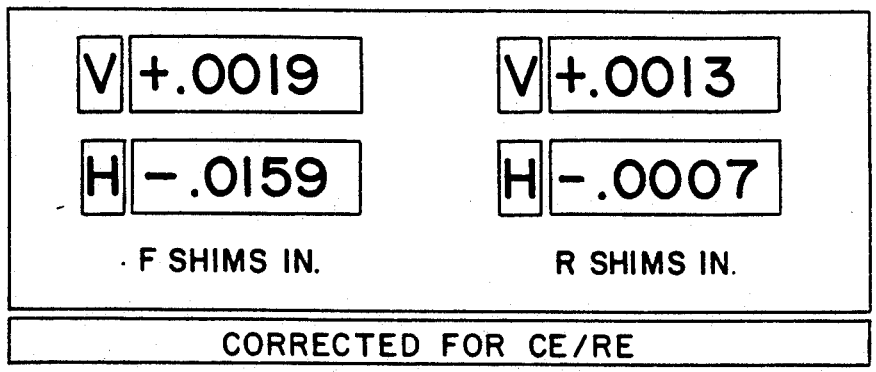

FIG. 10

TARGET: T-261 TARGET CONNECTED TO PART A

CURSOR → | 1.000 (VERTICAL — ANGULAR MODE) |
1.000 (VERTICAL - ANGULAR MODE)
1.000 (HORIZONTAL- ANGULAR MODE)
1.000 (VERTICAL - CENTER MODE)
1.000 (HORIZONTAL- CENTER MODE)

| -.0250 | ← ACTIVE WINDOW

FIG. 11

(1) OPPOSED SPINDLES
(2) (NOT SELECTED)
(3) ADJUSTBLE ON LEFT SIDE
(4) TARGET ON RIGHT SIDE
(5) TWO POINT SHIM
(6) NOT SELECTED
(7) SHIM ON RIGHT SIDE
(8) HORIZ. FEET BEHIND
(9) VERT. FEET BEHIND
✱✱✱ CONTINUE ✱✱✱

LINE : #4 BLOCK LINE
STATION : #24
HEAD : 3A
FILE NAME: HD001001.001

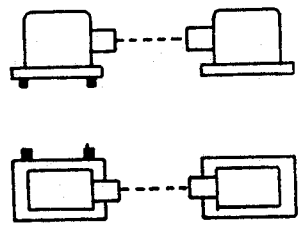

FIG. 12

A = 2.000 IN.
B = 22.500 IN.
C = 10.000 IN.
| D = 3.000 IN. |
E = 22.500 IN.
F = 10.000 IN.
✱✱ TOGGLE UNITS (mm or in.)
✱✱ ✱✱✱ CONTINUE ✱✱✱

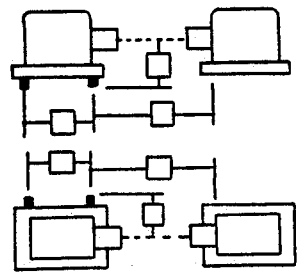

VC is calibrated Vertical Center Reading (Reading from interface−KVC)*Cal factor
HC is Calibrated Horiz Center Reading (Reading from interface−KHC)*Cal factor VA is Calibrated Vertical Angle Reading (Reading from interface−KVA)*Cal Factor
HA is Calibrated Horiz Angle Reading (Reading from interface−KHA)*Cal Factor KVC etc are the correction TCE's EVC = Efective Vertical Center Reading (Reading as if tgt were located at ECP)
EHC = Efective Horiz Center Reading (Reading as if tgt were located at ECP)

EVA = Efective Vertical Angle Reading (Reading as if tgt were located at ECP)
EHA = Efective Horiz Angle Reading (Reading as if tgt were located at ECP)

Note: Ecp=Efective Cell Plane is located over front foot of moving head

Sn is a reading sign corrector. It = +1 for Screen 4A and −1 for 4B

LFV, AND LFH are the distance from the ROT to the front foot on the moving unit

SNH= +1 for 8B else = −1
SNV= +1 for 9B else = −1

| V | FFV=(VC−VA*(LFV*SNV)*SN)+ABS(CFV*(1−COS(VA))) | RFV=FFV+VA*FRV |

| H | FFH=(HC−HA*(LFH*SNH*SN))+ABS(CFH*(1−COS(HA))) | RFH=FFH−HA*SN*FRH | FAH=−HA*SN*FRH |

ROTATIONAL ORIENTATION SENSOR FOR LASER ALIGNMENT CONTROL SYSTEM

CROSS-REFERENCE TO RELATED APPLICATION

This application is a continuation-in-part of U.S. patent application Ser. No. 427,759 entitled LASER ALIGNMENT CONTROL SYSTEM which was filed by Martin R. Hamar on Oct. 26, 1989.

BACKGROUND OF THE INVENTION

Automated manufacturing processes often require precise machining or manufacturing operations to be performed by at least one machine on a workpiece. For example, automated industrial machines may be required to initially bore one or more holes in a piece of stock material. The same machine or a second machine may then be operative to chamfer or enlarge the entrance to the previously bored hole. Still another machine or another part of the original machine may then be operative to tap threads into at least a portion of the previously bored hole. Continuing with this example, the axis of the hole being bored and tapped may be obliquely aligned to adjacent surfaces of the stock material, and at least portions of the machining operation may take place at a relatively inaccessible location within the stock material. Machining operations of this type are carried out widely, for example, in the automotive industry. Large numbers of machining operations must be carried out on engine blocks and on the housings for carburetors, fuel pumps, distributors and such. A very high degree of precision generally is required for such machining operations. This great precision not only improves the quality of the part being produced, but also increases tool life and reduces down time for a machine line. Even small improvements in the currently employed automated machine lines and corresponding reductions in down time can result in very significant cost savings.

All automated machine tool equipment includes means for adjusting the relative alignment between the machine tool and the workpiece. Some manufacturing lines may be adapted to adjust the position and alignment of the machine, others enable adjustments to the position and alignment of the workpiece, while still others enable adjustments to be effected on both the machine tool and the workpiece. The particular arrangement for adjustability will depend, in part, upon the manner of movement of the machine tool and/or the workpiece during a machining operation. Typically adjustments to the machine tool and/or the workpiece are carried out by shim assemblies which are adjustably positioned between the machine tool and a base and/or between the workpiece and a base.

Machine tool alignment typically is checked by employing a master part. A master part is a precisely manufactured piece of stock material that accurately duplicates at least a portion of a specified part. The position and alignment of the machine tool and the master part can be compared, and adjustments to one or both may be effected as needed.

The most widely employed prior art apparatus for checking alignment includes mechanical or electromechanical gauges and/or instruments. The spatial positions and orientations of tools and master parts can be determined by mechanical means which may be operatively connected to electronic readouts to provide an indication of alignment errors. These mechanical or electromechanical gauges are generally complex, costly pieces of equipment that are specifically dedicated to a particular machine or a particular type of machine. Additionally, even the most sophisticated mechanical or electromechanical gauge is subject to geometric distortion in response to the effects of gravity, temperature changes or other variables.

Laser beams are known to define a substantially straight line that is dimensionally stable over a relatively long distance. Lasers have been used in combination with photosensitive targets that are operative to sense and identify the location of the center of energy of a laser beam impinging thereon. This combination of a laser emitter and a photosensitive target have proved to be extremely efficient and accurate for measuring alignment between two spaced apart objects. In particular, the laser emitter may be mounted to one object to be aligned while the photosensitive target is mounted to the other object to be aligned.

A background discussion of early work in laser alignment is presented in *Laser Alignment In Industry*, ASTME Technical Paper MR68-408, 1968 and in *Laser Alignment-Current Uses And Applications*, SME Technical Paper MR76-864, 1976.

The operative part of a photosensitive target is a small planar photocell rigidly mounted in a housing. It is often extremely difficult to ensure that the surface of the photocell in the housing of the target is disposed at the preferred target point in the machine tool or master part to be aligned. In particular, the photocell often is disposed forwardly or rearwardly of the point to be aligned or is angularly aligned thereto because of geometric constraints of the target housing, the master part or the machine tool. These errors in the mounting position would yield measurement errors that would offset the potential accuracies of the laser alignment system. These problems were overcome by U.S. Pat. No. 4,483,618 which issued to Martin R. Hamar on Nov. 20, 1984. In particular, the target of U S. Pat. No. 4,483,618 includes a mirror disposed such that a laser beam incident upon the mirror is reflected to a photocell. The photocell is disposed such that the optical distance between the reflective surface of the mirror and the photocell is equal to the distance between the reflective surface on the mirror and a point on the workpiece or tool to which alignment will be compared. These equal distances enable accurate measurements for those instances where it is inconvenient or impossible to actually place the photocell at the desired measurement point. This equidistant relationship ensures that the target of U.S. Pat. No. 4,483,618 will provide accurate readings despite any angular misalignment of the target housing on the object to be aligned. Despite these many advantages, a target manufactured in accordance with U.S. Pat. No. 4,483,618 may be geometrically well suited for one master part or machine tool, but not geometrically well suited for a different master part or machine tool. The structural requirements of these targets makes it impractical to consider adjustably mounting the photocell relative to the mirror to better accommodate geometric constraints of the particular machine system being aligned.

Another very significant laser alignment apparatus is shown in U.S. Pat. No. 4,566,202 which issued to Martin R. Hamar on Jan. 28, 1986. U.S. Pat. No. 4,566,202 shows a laser emitter which can be mounted in a spindle or chuck of a rotating tool holder. The laser emitter of U.S. Pat. No. 4,566,202 is used in combination with a photosensitive target which may be the target of the above described U.S. Pat. No. 4,483,618. The laser apparatus of U.S. Pat. No. 4,566,202 is used by rotating the tool holder in which the laser emitter is mounted. An improperly aligned tool holder will cause the laser beam to generate an annulus on the target mounted in the master part. The displacement and angular alignment of the laser beam can be accurately determined by readings from the target and appropriate adjustments can be made. Although this system is extremely effective, it may require the technician to perform various arithmetic calculations to determine the type and amount of misalignment and the adjustments that would be required to correct the misalignment. These arithmetic calculations may go beyond the abilities of the technician or machinist responsible for ensuring proper alignment. Microprocessors with appropriate software have been made available through Hamar Laser Instruments, Inc. to facilitate certain of these mathematical calculations. However, some technicians have encountered difficulties in working with the available microprocessors, computers and related software. Some of the difficulties have related to the need to convert error readings into actual adjustments. Other technicians have encountered difficulties as they move the available laser alignment equipment from one machine tool and work station to another on a particular manufacturing line, or as they move the laser equipment from one manufacturing line to another. In particular, a technician may have to employ different series of alignment steps and calculations depending upon the equipment being aligned. On some equipment the laser emitter is most conveniently mounted to the tool holder, while on other equipment the laser emitter is most conveniently mounted on the master part. In some instances adjustments are most conveniently made to the tool holder, while in other instances adjustments are more readily made to the master part.

Although the laser alignment equipment shown in U.S. Pat. No. 4,483,618 and in U.S. Pat. No. 4,566,202 are sufficiently adaptable to be used on virtually all machine tool systems, the differences in the laser set up, mathematical calculations and alignment steps have often been confusing to the typical technician.

The prior art further includes U.S. Pat. No. 4,679,940 which also issued to Martin R. Hamar. U.S. Pat. No. 4,679,940 relates to a control system for a photosensitive target for indicating incidence of the beam on the target, for shifting the electrical sensing center of the photocell to the center of the target housing and for compensating for variations in laser beam intensity.

Another problem with even the more sophisticated laser alignment systems relates to the rotational orientation of the photosensitive target and/or the laser emitter at the time each reading is made. In this regard, a typical laser alignment system requires the laser emitter and/or the photosensitive target to be positioned at each of several different rotational orientations at which readings will be taken. The preferred measurement operation includes taking readings at four rotational positions separated from one another by 90° degrees, namely 12 o'clock, 3 o'clock, 6 o'clock and 9 o'clock. To facilitate this aspect of the laser alignment, the photocell target and/or the laser emitter may be provided with four bubble levels. The technician may be required to follow a set sequence wherein the bubble levels are sequentially employed to position the photosensitive target or the laser emitter at the 12, 3, 6 and 9 o'clock positions for readings. The computerized systems that vastly simplify or eliminate the computations required by the technician typically will specify that the readings be taken in a particular order (e.g. 12, 3, 6 and 9 o'clock). If the technician inadvertently takes readings in a different order, the computer will calculate incorrect errors and identify inappropriate adjustments to be made for correcting those errors. Thus, the great precision enabled by laser alignment equipment and the computational efficiencies afforded by computers can be completely offset by the mere incorrect order of readings taken by a technician.

Error measurement and resulting computations can be further complicated even in those situations where readings are taken in the proper sequence. For example, machine tools are often disposed in close proximity to other manufacturing hardware Structures adjacent to the machine tool being aligned may prevent the laser alignment system from being rotated through the preferred range of 12, 3, 6, and 9 o'clock orientations. In particular, the wires leading from the laser emitter or the photosensitive target may prevent complete rotation of one or both units. Although an ability to take readings at rotational positions of 2, 6 and 10 o'clock could provide the necessary data for accurately calculating errors and identifying necessary corrections, the computer may not be structured for such angular orientations and the bubble levels generally would be improperly positioned for assuring to the computer that the proper rotational orientation has been achieved.

Still further, a good quality bubble level can provide fairly accurate information as to angular orientation. However, the errors possible with a technician manually aligning a bubble level are far greater than the precision enabled by the laser emitter and photosensitive target. Thus, the high degree of precision enabled by sophisticated photo optical electronic equipment is partly offset by the inaccuracies of manually positioning a bubble level.

Although the above described laser alignment systems are extremely effective and accurate, it is desirable to provide an improved laser alignment system that can be more readily employed and understood by field technicians.

Accordingly, it is an object of the subject invention to provide an improved laser alignment system for aligning machine tools and other apparatus having parts that are movable relative to one another.

It is another object of the subject invention to provide a laser alignment system that avoids the need for mathematical calculations by the technician using the system.

It is a further object of the subject invention to provide a laser alignment system that can be used with any of a plurality of different machine tools in an industrial work place.

Yet another object of the subject invention is to provide a laser alignment system that accurately identified displacement and angular alignment errors and that further identifies the specific machine or workpiece adjustments needed to correct the errors.

SUMMARY OF THE INVENTION

The subject invention is directed to a laser alignment system which comprises a laser emitter and a photosensitive target. The target comprises at least one photocell which is mounted in a housing and which is operative to identify the location of the center of energy of a laser beam impinging thereon. The target employed in the system of the subject invention includes mounting means for mounting the target on either the master part or in the spindle or other such mounting means of a rotatable tool. Similarly, the laser emitter includes mounting means for mounting the laser emitter either on the master part or in the spindle or other such mounting means of the rotating tool. Thus, the laser emitter and the target are interchangeably mountable in either the master part or the rotating tool, with the selection being based upon the particular construction of the system being aligned and on the preference of the technician performing the alignment.

The master part and/or the rotating tool may comprise prior art means for adjusting their respective location and alignment. In most instances, the adjustment means will comprise shim assemblies or shim packs, and will be referred to herein generally as shims. However, it is to be understood that the term shim, as employed herein, is not intended to be limiting, and is intended to encompass other adjusting means for the tool and the workpiece.

The system of the subject invention further comprises a data acquisition subsystem or interface which is operatively connected to the target to receive electrical signals from the one or more photocells of the target. The signals generated by the one or more photocells of the target are indicative of the location of the center of energy of the laser beam impinging thereon. The known interfaces for use with such targets enable the signals generated by the targets to be converted into X-Y displacement data and angular alignment data.

The system of the subject invention further comprises a computer which is operatively connected to the interface. The computer is operative to store, selectively recall and use data describing a plurality of different machine tool systems in a manufacturing plant, any one of which can be aligned by the subject system. This input data describing the various machine tool stations that may be aligned includes an identity of the portion of the system that is most readily adjustable. For example, as noted above, some work stations will be constructed such that adjustments are more readily made to the master part, while other work stations are constructed to more readily facilitate adjustments to the machine tool head. The more readily adjustable portion of the work station is identified as the "movable unit". The "movable unit" is selected by the technician based upon his or her understanding of the machine layout. The "movable unit" may vary from one station to the next, and the designation may readily be changed by the technician.

The computer of the subject invention also functions to generate an "effective target". The "effective target" is a mathematical target that is always effectively placed on the designated "movable unit" by the computer. Thus, the computer places the "effective target" on the "movable unit" even if the system configuration is such that the actual target is more conveniently placed on the component that is not readily adjustable. The "effective target" concept also facilitates the alignment to positions inside a machine tool or workpiece that would not otherwise be physically accessible. Rather, the computer will perform the mathematical calculations to place the "effective target" at the desired location even though it may not be possible or convenient to place the actual target at that location.

The subject invention also is directed to an efficient method which comprises the steps of making the ways of the wing base or spindle holder straight; adjusting the wing base ways parallel to the master part axis; making the spindle axis parallel to the master part axis and centering the spindle to the master part axis. In each of these operative steps of the subject method, the computer provides a clear, simple visual readout which may provide instructions to the technician along with numerical and graphic data identifying both the raw error and the adjustments needed to correct the error on the particular machine tool station being aligned. In particular, the computer will provide graphic displays indicative of the top and side views of both the rotating tool and the master part to be aligned. The graphic displays of these operative portions of the system show the direction of misalignment therebetween. A center line picture changes on the computer display in real time as the alignment is adjusted. Numerical angle and centering errors also are shown at the same time. The computer also is operative to generate certain portions of the alignment information in large numbers which can be viewed from a considerable distance, and thereby enables appropriate adjustments to be made at locations on the system remote from the computer.

The photosensitive target and/or the laser emitter of the subject laser alignment control system may include rotational orientation sensing means. The rotational orientation sensing means may be operatively connected to the data acquisition subsystem or interface to identify the particular rotational position of the target for each reading being taken. Thus, it is unnecessary for the technician to perform readings in a specific order or to specifically input rotational orientation alignment data to the data acquisition subsystem.

The rotational orientation sensing means may comprise a plurality of conductive pins defining loci of a circle in a plane perpendicular to the rotational axis. A conductive member may be disposed intermediate the pins and may be dimensioned to move into contact with a plurality of the pins as the target or laser emitter is being rotated. The conductive member may define a disc, a washer or a conductive liquid. The particular combination of conductive pins contacted by the conductive member will identify the rotational orientation of the target or laser emitter.

An alternate rotational orientation sensing means comprises a separate laser source and a separate photosensitive target which may be mounted in the housing of the target or laser emitter being rotated. The laser of the rotational orientation sensing means may be generated from the primary laser source used for alignment, and may be diverted from the primary laser beam by a beam splitter and other optical members. The laser beam of the rotational orientation sensing means is aligned generally parallel to the rotational axis of the housing. The rotational orientation sensing means further includes an optical member rotationally mounted on bearings and having means for ensuring a uniform gravitational orientation of the optical member. For example, the optical member may be provided with a weight that will maintain the rotationally mounted optical member in a fixed gravitational position for all rotational orientations of the housing. The optical member of the rotational orientation sensing means may define a prismatic wedge or other optical means for diverting the incoming laser beam from its original path. The angle of such diversion will be constant for all rotational orientations of the housing. However, the x-y coordinates of the laser beam on the target of the rotational orientation sensing means will vary in accordance with the particular rotational orientation. The target of the rotational orientation sensing means is operatively connected to the data acquisition subsystem or interface. The particular x-y coordinates of any reading can readily be converted by the interface into a corresponding rotational orientation. Thus, it is irrelevant what order the readings are taking in or whether the readings vary from the preferred 12, 3, 6 and 9 o'clock positions.

BRIEF DESCRIPTION OF THE DRAWINGS

FIG. 10 illustrates a Main Numerical Display Screen with information thereon generated by the computer of the present invention.

FIG. 11 illustrates a Target Calibration Screen showing information thereon generated by the computer of the present invention.

FIG. 12 illustrates a Configuration Review Screen with information thereon generated by the computer of the present invention.

FIG. 13 illustrates a Dimension Input Screen with information thereon generated by the computer of the present invention.

FIGS. 14A and 14B present the calculations that are conducted utilizing the input data and the measured data generated by the system.

DESCRIPTION OF THE PREFERRED EMBODIMENTS

Figure 1:
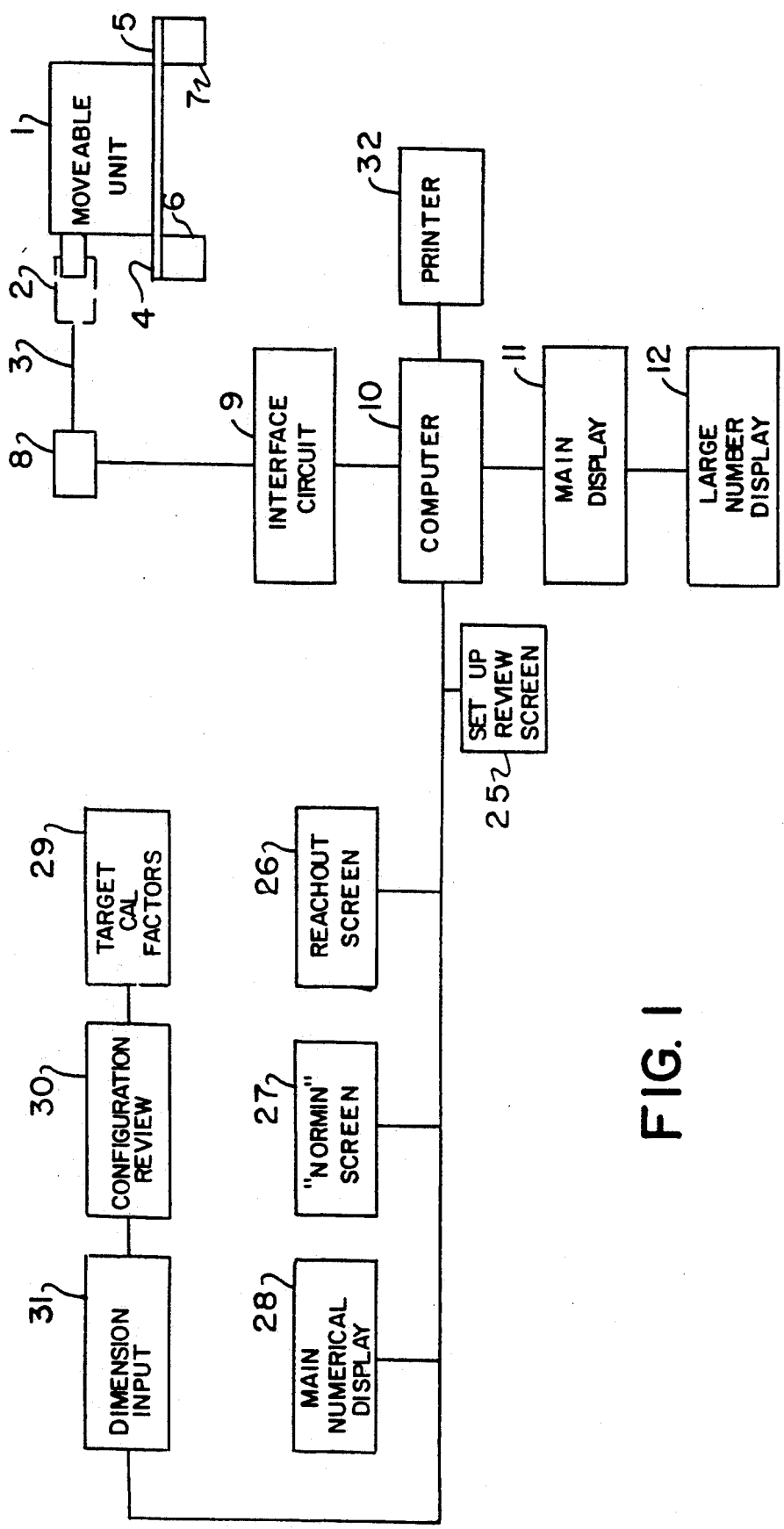
FIG. 1 is a general schematic of the system of the present invention.

FIG. 1 shows one arrangement for the system of the present invention where a movable unit 1, which may be either a "master part" or a rotatable tool holder, has mounted thereto a laser emitter 2 which emits a laser beam 3. The movable unit 1 is mounted on shim feet 4 and 5 which respectively rest on shim assemblies 6 and 7. The shim assemblies 6 and 7 can be adjusted, whereupon the positions of shim feet 4 and 5 and hence the position of the movable unit 1 and the laser emitter 2 can be moved such that the alignment of the laser beam 3 is changed. The laser beam 3 impinges on a photosensitive target 8 which is mounted on either a "master part" or rotatable tool holder. The target 8 may be a Model T-261 target manufactured by Hamar Laser Instruments, Inc. Information as to the position and angle of incidence of the laser beam 3 on the target 8 is conveyed to interface circuitry 9 and hence to a computer 10. The computer 10 outputs information on a variety of displays including a main display 11, a large number display 12 and printer 32.

Figure 2:
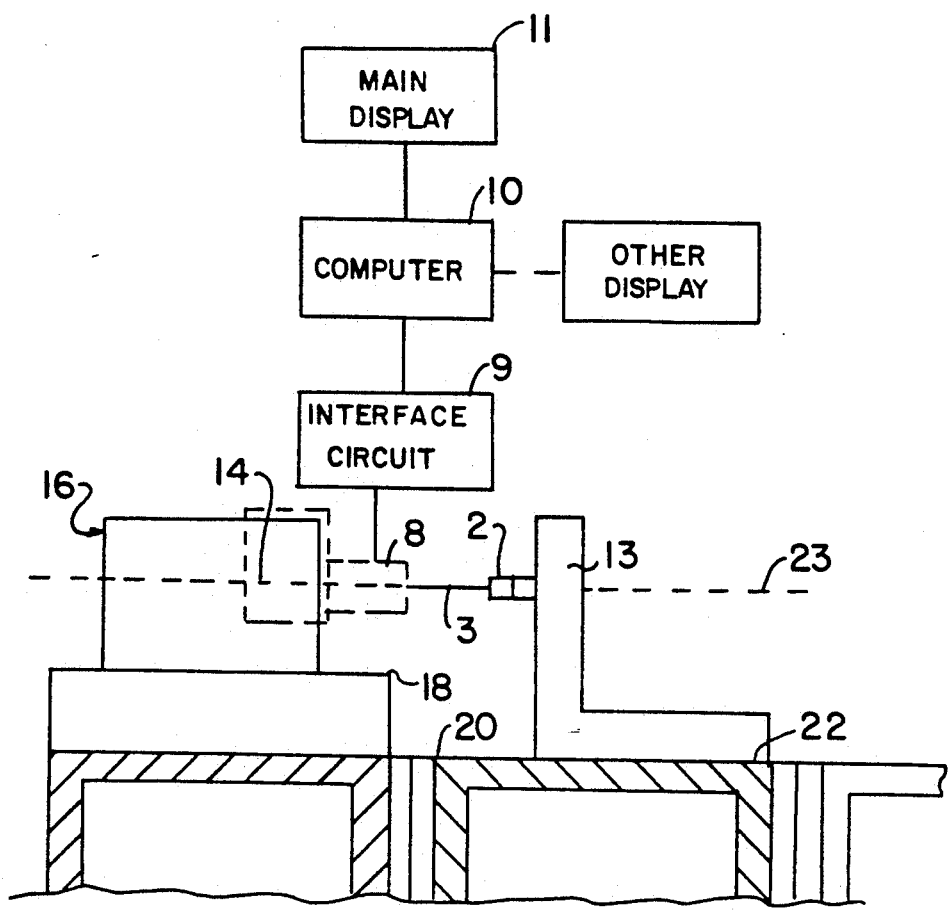
FIG. 2 is the schematic of a preferred embodiment of the system of the present invention.

FIG. 2 shows one possible arrangement of the components illustrated schematically in FIG. 1 wherein a master part 13 has the laser 2 mounted thereon to emit the beam 3. The beam 3 impinges upon target 8 which is mounted in a spindle 14 of a machine tool 16. The machine tool 16 rests on a shim assembly 18 which in turn is supported by wingbase 20. Likewise, the master part 13 is supported by centerbase 22. Information is conveyed from the target 8 through interface circuitry 9 to computer 10 which outputs spindle positioning and other information on the main display 11 and other displays whereupon an operator can correct the spindle alignment through use of the shim assembly 18.

As stated previously, the major steps of spindle alignment using the system of the subject invention are the making of the wingbase way straight, adjusting the wingbase ways such that they are parallel to the master part axis, making the spindle axis parallel to the master part axis and centering the spindle to the master part axis.

At the outset it should be noted that the master part axis is the primary reference generally used to align the spindles. Alignment of the spindle 14 to the axis 23 of the master part 13 in FIG. 2 is facilitated with the subject invention by the computer 10 which generates an "effective target". This "effective target" is a mathematical target which is always placed on a movable unit, such as the movable unit 1 in FIG. 1, by computer 10. The computer is able to "read" from the four-axis target 8 in FIG. 1 or 2 enough information so that it can calculate what this "effective target" should read had the target 8 really been mounted on the movable unit 1 of FIG. 1. The computer 10 displays this reading of the "effective target" through the main display 11 and/or any other display. The reading will be the same whether the laser 2 or the target 8 is mounted on the movable unit 1 of FIG. 1.

Figure 3:
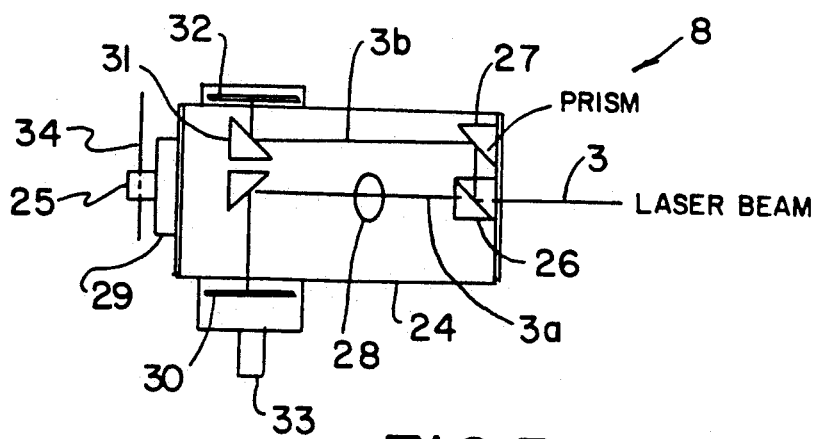
FIG. 3 is a cross-sectional view taken along a center line of the target of the present invention.

As shown in FIG. 3, the target 8 includes a housing 24 with a mounting stud 25 extending rigidly therefrom. The mounting stud 25 is dimensioned for mounting the target 8 in a spindle or master part, such as the spindle 14 or master part 13 depicted in FIG. 2. A beam splitter 26 is mounted in the housing 24 and is operative to transmit approximately 50% of the incoming laser beam 3. The transmitted beam is identified by the numeral 3a in FIG. 3. The remaining 50% of the incoming beam 3 is reflected 90° by the beam splitter 26 from its original path and toward a right angle prism 27. The prism 27 is operative to reflect the beam another 90°. This reflected beam is identified generally by the numeral 3b and extends substantially parallel to the transmitted beam 3a. The transmitted beam 3a passes through a collimating lens 28 and is reflected 90° again off prism 29 and toward a target cell 30. The beam 3b is reflected 90° off prism 31 toward target cell 32. The target cells 30 and 32 are electrically and operatively connected to the interface circuit 9 FIGS. 1 and 2 by cable 33, as shown in FIG. 3. Each target has an active flat surface or cell plane which is operative to collect the energy of the laser beam 3a or 3b impinging thereon, and to provide a signal identifying the position of the center of energy of the laser beam 3a or 3b thereon.

The effective cell plane 34 shown in FIG. 3 is a location spaced from the reflective surface of the prism 29 a distance which is equal to the distance between the reflective surface of the prism 29 and the target cell 30. The location of the effective cell plane 34 may be specifically identified on the mounting stud 25 of the target 8 to enable placement of the effective cell plane at a desired measurement or alignment point on the machine tool or master part depicted in FIG. 2. This construction, as explained in the above described prior art U.S. Pat. No. 4,483,618 enables the target 8 to function exactly as if the target cell 30 were placed at the effective cell plane 34. Additionally, as explained in the prior art U.S. Pat. No. 4,483,618, the illustrated disposition of the target cell 30 and the effective cell 34 renders the target 8 substantially insensitive to angular misalignment about the desired measurement or alignment point on the machine tool or master part. The target 8 illustrated in FIG. 3 provides certain advantages beyond those illustrated in the above referenced U.S. Pat. No. 4,483,618. In particular, the target 8 enables angular alignment data to be collected by the target cell 30 while displacement data is simultaneously being collected by the target cell 32. In contrast, the prior art targets had required these readings to be taken sequentially, with a collimating lens being selectively positioned in the path of the incoming laser beam. The construction of the target 8 illustrated in FIG. 3 enables the simultaneous assessment of displacement and alignment data, thereby greatly facilitating machine alignment processes. Additionally, the computer referred to herein enables the efficient use of the data collected by the target cells 30 and 32 to indicate alignment and displacement errors and to indicate the specific adjustments that will be needed for the particular machine tool station being aligned.

Figure 4:
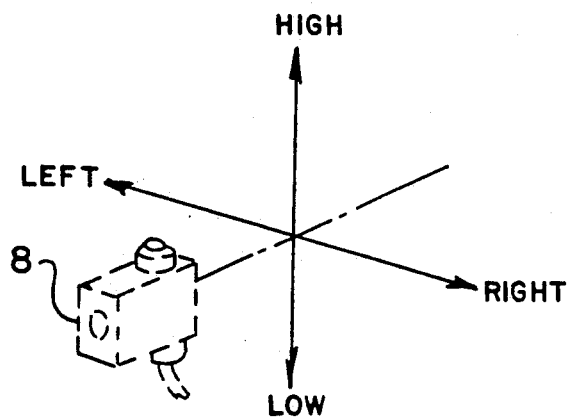
FIG. 4 is a perspective view illustrating the "effective target" concept of the present invention.

FIG. 4 is a perspective view of the target 8 which shows how the "effective cell plane" concept is especially useful because the "sense" of the readings—that is, high and low and left and right—are stated to be those which would be expected if one were looking into or at the spindle of the movable unit.

Figure 5:
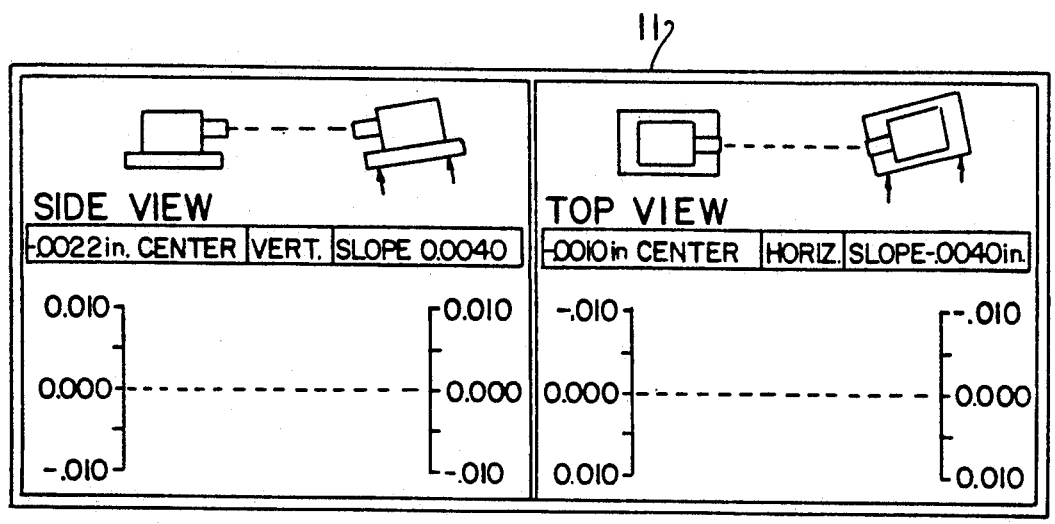
FIG. 5 illustrates a main display screen showing information output from the computer of the invention.

FIG. 5 shows the main display 11 generated by the computer 10 of the inventive system. As shown therein, the main display 11 gives both a side and top view of the spindle misalignment. The glyphs or pictures in the upper part are a "side" and "top" view of the spindle misalignment. They only show the direction of misalignment. On the other hand, the display on the lower half of FIG. 5 can be thought of as a representation of the spindle center line. It shows both the amount and direction of spindle center line misalignment. This display is active and will move proportionately to a spindle head move. When it shows 0-0 the spindle is aligned. The numbers in the middle refer to the error under the front and rear shim feet 4 and 5 (FIG. 1). This numerical display can be toggled between a "shim" display which shows the actual move required and an "error" display which shows the actual misalignment.

Figure 6:
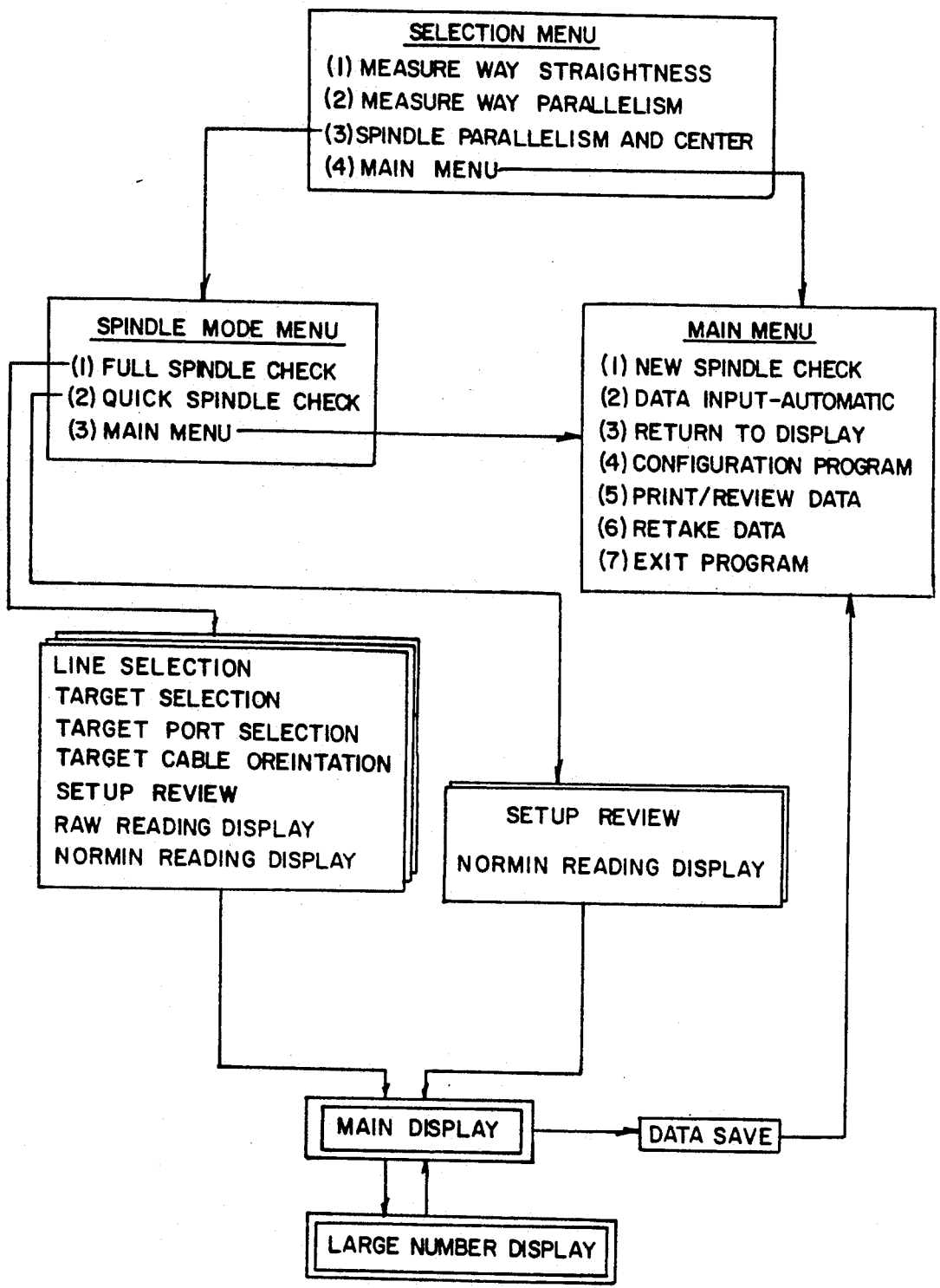
FIG. 6 is a flow chart illustrating how the various system processes of the invention are implemented in the computer of the invention.

Reference to the flow chart of FIG. 6 makes it clear that the main menu in the program represents the primary way of moving about the various parts of the program. Also, the main menu may be reached from any of the first operational menus ([1], [2] and [3]).

It should be noted that the main menu is not required for aligning spindles. However, if any number of functions such as calibration, recalling of data, resetting of some parameters or calibration of targets is necessary, the main menu is the choice to further direct the use to other parts of the program.

The seven main menu choices are herein described in some detail:

The new spindle check menu choice simply restarts the program with a brand new check. Selection of this menu choice merely restarts the operational steps of the program.

The data input-automatic menu selection merely facilitates a toggling operation wherein it allows the operator to switch between automatic or manual data input.

The return to display choice simply returns an operator back to the current display he or she had been working on. All data is retained and an operator may go "back to work" with that particular spindle.

The configuration program menu selection is a branch to the configuration (selection of spindle work station and line) and calibration portion of the program.

The print review data menu selection allows an operator to review data that has been saved. This can be current data for a spindle presently being worked on, or data from older spindle measurements. The data can be printed if desired.

The retake data menu choice is used when a spindle has been aligned and it is desired to take a new set of "Normin" readings prior to completing a job. If this menu choice is used, the operator is returned directly to the set-up review screen of FIG. 7 just prior to the "Normin" screen itself.

The exit program exits the program and returns the operator to disk operation system. At this point the computer would be turned off.

As shown in the flow chart of FIG. 6, the spindle mode menu comprises a first major branch in the program. Its menu choice selections comprise full spindle check, quick spindle check and main menu. The main menu choice has already been discussed in detail. Quick spindle check proceeds directly to the set-up review screen. A full spindle check requires the user to go through all the set-up screens.

The menu choices after a full spindle check are detailed as follows:

The line selection menu choice allows the operator to view a selection of three display screens respectively dedicated to the lines, stations, and heads of the manufacturing facility. This enables the operator to conform the computer to a particular configuration of line, station, and head that is being employed for a manufacturing operation.

Target selection is a menu choice wherein the operator "tells" the computer which target he or she is using. These targets can be listed by number. The program automatically loads calibration factors for the particular selected target.

The target port selection makes available to the operator a screen whereby the operator will "tell" the computer where he has connected the target shown in the screen above as, for example, by inputting the entries "connect target to port A" or "connect target to port B".

The target cable orientation menu allows the operator to "tell" the computer whether a 12-6 o'clock or 3-9 o'clock target cable orientation will be made for the "Normin" mounting error correction measurements.

Figure 7:
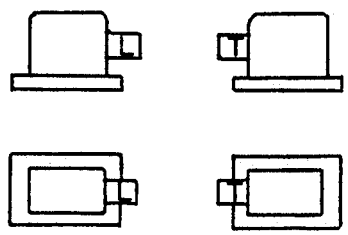
FIG. 7 shows a setup review screen with information thereon generated by the computer of the invention.

The quick spindle check menu selection on the spindle mode menu enables the operator to view the set-up review screen 40 of FIGS. 1 and 7. The pictures to the right on the screen of FIG. 7 show where the laser and target should be mounted for alignment. It is important that they be mounted as shown because the computer is "expecting" this set-up and will calculate and display the spindle misalignment based on the set-up shown.

Figure 8:
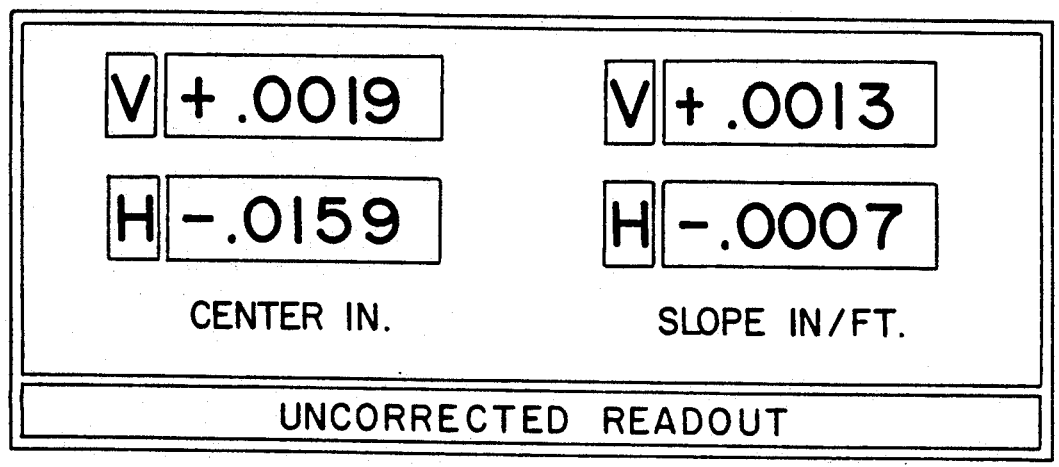
FIG. 8 shows a Raw Readout Screen with information thereof supplied from the computer of the present invention

The raw reading display menu choice from the full spindle check menu displays for the operator the raw readout screen 42 of FIGS. 1 and 8. The raw readout screen shows four sets of numbers: vertical and horizontal center and vertical an horizontal angle. These readings are raw readings in that the operator is reading the target in its real location, not the "effective target". The entire purpose of the raw readout screen 42 of FIG. 8 is to allow the operator to detect whether the laser and target are properly mounted in their spindles. If they are poorly mounted due to chips, burrs or inaccurate fixturing, significant errors can result, especially if alignments of great precision are required.

Figure 9:
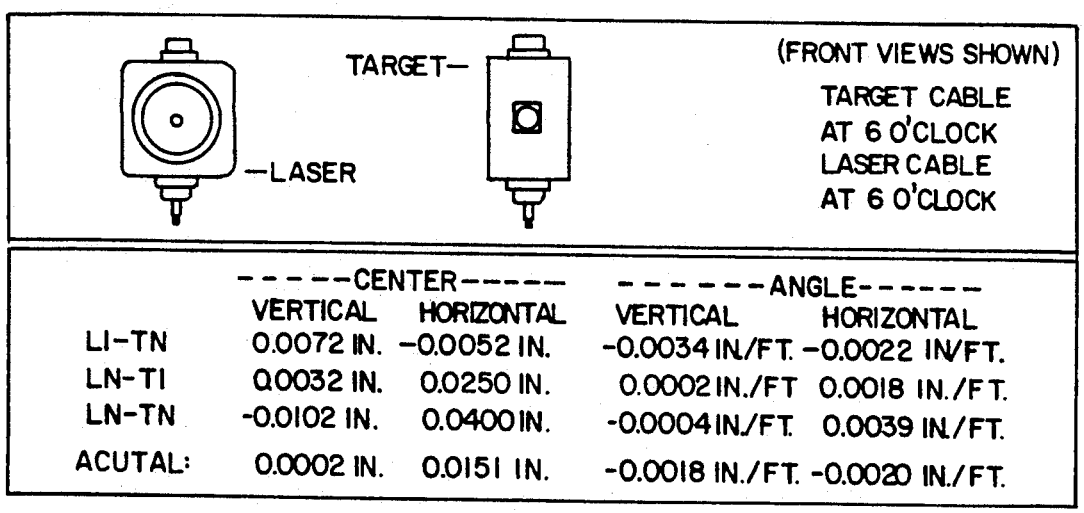
FIG. 9 illustrates a "Normin" Screen with information thereon generated by the computer of the present invention.

The "Normin" reading display menu choice of the full spindle check menu shown in FIG. 6 results in the display of FIG. 9. The word "Normin" refers to the Normin principle of taking two reading of "NORMal reading" at 0° and an "INverted reading" at 180°. The two readings of the laser plane and the target plane are combined in the computer to determine the mounting errors of both laser and target. The computer can subtract the mounting errors from incoming "raw" reading and then display mounting errors that are "clean". The operator sees pure spindle to master part misalignment errors.

The target used with the computer program for "Normin" display is the simultaneous four-axis target that outputs both center and angle information at the same time. Only three "Normin" readings need be taken to establish the mounting errors. The upper left part of the screen of FIG. 9 shows the operator where to rotate the laser and target, and the upper right side tells the operator where to rotate the laser and target.

The numerical display 34 shown in FIGS. 1 and 10 for the full spindle check can be shown in any one of several configurations. It can show misalignment at the front and rear shim feet 4 and 5 (FIG. 1) as the main display or it can show center and slope misalignment. Choice of these modes depends on the prevailing conditions. In some cases, it is desirable to look directly at the slope. Generally speaking, spindles are adjusted for parallelism first and then for center. If shim moves are being made, then the ship type of display would be the better choice. The above mentioned full spindle numerical displays can be toggled between English and metric units.

The numerical display for quick spindle is exactly the same as for full spindle except it only shows center and angle mode. It cannot show shim errors, since this quick spindle has no dimensional information. The quick spindle portion of the program is thus unable to calculate the shim errors and moves.

In addition to the operations program whose flow chart is shown in FIG. 6, the computer of the inventive system described herein also has a program side in which configurations are established. The configuration side provides for two principal tasks to be performed, that is, target calibration and the setting up of configurations. The configuration side is reached through the configuration program choice on the main menu shown in FIG. 6. This is the side of the program where all configurations are set up or modified. The main menu for the configurations side of the program comprises the three choices of configuration and data menu, set up configuration, and return to main program. Among the screen displays output by the computer in response to the configuration side of the program are the target calibration factor screen 46 shown in FIGS. 1 and 11, the configuration review screen 48 of FIGS. 1 and 12 and the dimension input screen of FIGS. 1 and 13. The target calibration screen 46 shown in FIG. 11 discloses an active window entitled "Vertical-Angular Mode" which is an active readout for the axis of the target which has been highlighted. This window will "connect" to a different axis upon input from the operator. The configuration review screen 48 of FIG. 12 allows the operator to review and change all of the choices made with regard to configuration information. After making a change, the operator is returned to the configuration review screen whereby additional changes can be made. When the configuration is correct, the operator must "name" the configuration which has been set up before programming can continue. Any configuration already stored can be copied and also any configuration can be deleted.

The dimension input screen 50 of FIG. 13 denotes six dimensions by the letters A through F. The actual dimension required is shown by a two view picture on the right hand side of the screen. As a particular dimension is highlighted, such as the dimension "D=3.00 in" in FIG. 13, that letter designation is reverse videoed in the drawing to the right. Dimensions may be entered in either inches or millimeters. The program "remembers" all dimensions in English units and only converts to metric units when the metric option has been selected. The "file name" in the lower left corner is the name that this configuration is saved under on the disc. The computer remembers each configuration as a number so the line, station, and head designations are really saved in the file as numbers.

Figure 14A:
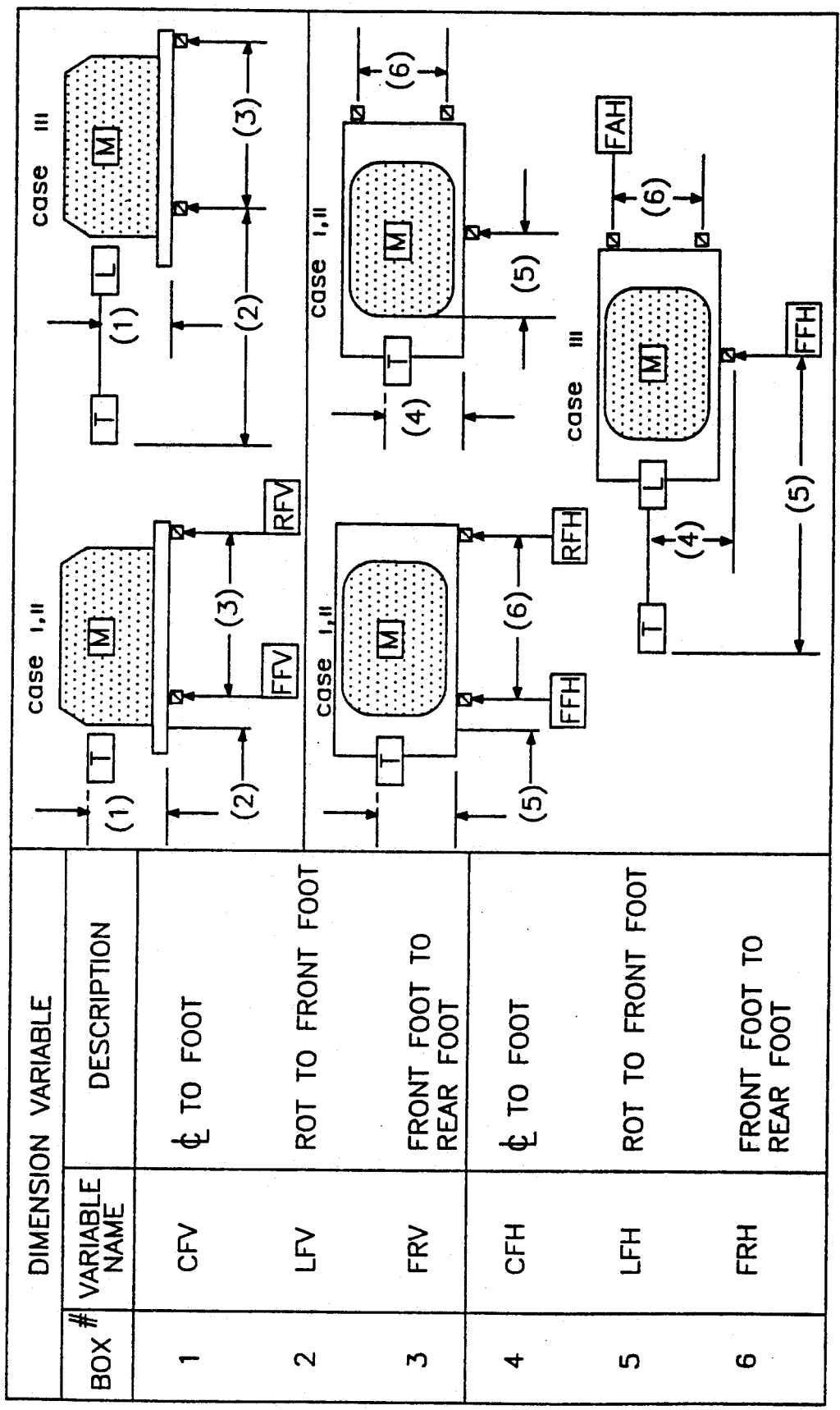

FIG. 14 displays the analysis completed by the system using input variables and measured data to determine the front foot and rear foot vertical adjustments (FFV and RFV) and the front foot and rear foot horizontal adjustments and horizontal angular adjustments (FFH, RFH and FAH). The abbreviations used in these equations are explained immediately before the equations in FIG. 14. In addition to those abbreviations, it should be noted that ABS is the standard abbreviation for absolute value, while the abbreviation ROT refers to "rear of target". It will be noted that the input data and the measured values are used in the equations to calculate shim adjustments even though the actual cell plane or "rear of target" is spaced a considerable distance from the shims or other such adjustment means, and in the case 3 illustration of FIG. 14, the rear of the target T is disposed on the nonadjustable member, while the laser L is mounted to the adjustable member.

Figure 15:
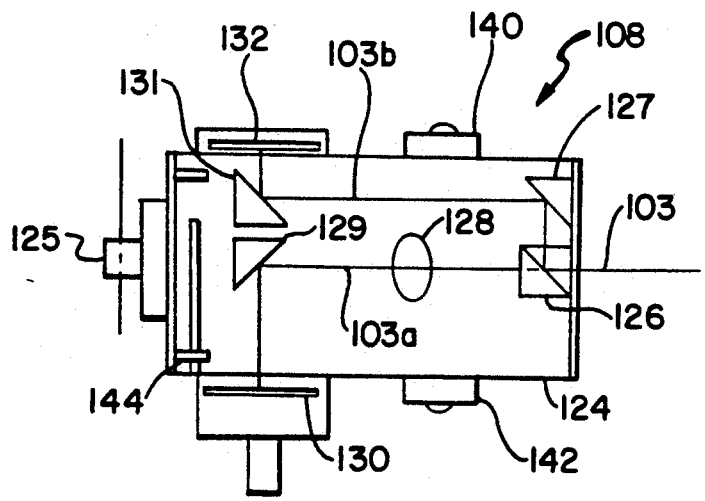
FIG. 15 is a cross-sectional view similar to FIG. 3 but showing an alternate target having rotational orientation sensing means therein.
Figure 16:
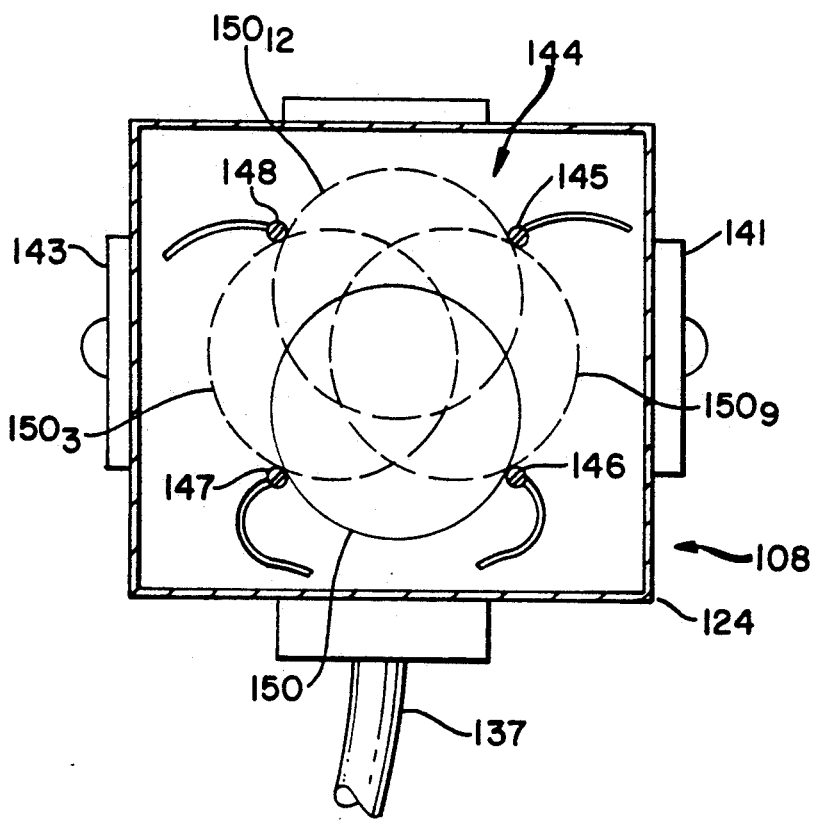
FIG. 16 is a cross-sectional view taken along line 16-16 in FIG. 15.

An optional target for use in the laser alignment system of FIG. 2 is shown in FIGS. 15 and 16 and is identified generally by the numeral 108. The target 108 is similar to the target 8 depicted in FIG. 3 and includes a housing 124 with a rigid mounting stud 125 for mounting the target 108 in a spindle or master part. A beam splitter 126 is mounted in the housing 124 and is operative to transmit approximately one-half of the incoming laser beam 103 along its original line of travel as indicated by 103a. The remaining portion of the laser beam is diverted as indicated by 103b. The diverted beam 103b is reflected 90° by a right angle prism 127 into an alignment substantially parallel to the incoming beam 103 and the transmitted beam 103a.

The transmitted beam 103a passes through a collimating lens 128 and is reflected 90° off a second right angle prism 129 and to a photosensitive target 130. The photosensitive target 130 is operative to sense the angle of the incoming laser beam. The diverted beam 103b of the original incoming laser beam 103 continues to a third right angle prism 131 and onto a target cell 132 which is operative to sense displacement.

As explained above, several readings are taken with the target 108 at each of a plurality of different rotational orientations. The preferred alignment procedure includes taking four separate readings at each of four rotational orientations of the target separated by 90° from one another. To facilitate this procedure, the housing 124 of the prior art target was provided with a plurality of bubble levels 140, 141, 142 and 143 illustrated schematically in FIGS. 15 and 16. The bubble levels 140-143 were employed by a technician to achieve four rotational alignments of the target 124 corresponding to the 12, 3, 6 and 9 o'clock readings. However, as explained above, the data acquisition subsystem expected to receive the four readings in a specified order. The data acquisition subsystem assumed that the readings it received resulted from the anticipated order of readings and would calculate errors and required adjustments based on that assumption. Consequently, if the technician completed the readings in any other order, the data acquisition subsystem would yield and entirely incorrect set of error calculations and a correspondingly incorrect set of corrections.

To avoid this problem, the target 124 is provided with a rotational orientation sensing means identified generally by the numeral 144 in FIGS. 15 and 16. The rotational orientation sensing means 144, as shown in FIG. 16 includes four conductive pins 145, 146, 147 and 148 respectively which are spaced from one another by substantially 90° and define loci of a circle orthogonal to the rotational axis of the target 124. The conductive pins 145-148 are operatively connected to the cable 137 extending from the target 124, and further are operatively connected to the data interface subsystem described and illustrated above.

The rotational orientation sensing means 144 further includes a conductive disc 150 movably captured intermediate the conductive pins 145-148 and dimensioned to engage no more than two of the conductive pins 145-148 at any one time. As shown in FIG. 16, the target is oriented with the cable 137 pointing in the 6 o'clock direction and with the conductive disc 150 supported by the conductive pins 146 and 147 and being spaced from the conductive pins 145 and 148. The conductive disc 150 will thus complete the circuit between the conductive pins 146 and 147, and thereby generate a signal interpreted by the data acquisition subsystem as a rotational orientation where the cable is aligned in the 6 o'clock direction.

Phantom lines are employed to show the other possible positions of the conductive disc 150 in different rotational orientations of the target 124. In particular, when the cable 137 is aligned in the 9 o'clock position, relative to the FIG. 15 vantage point, the disc 150 will be supported by and conductively contact the pins 145 and 146 as indicated by the phantom line disc $150_9$. When the target 124 ia oriented with the cable 137 aligned in the 12 o'clock position, the disc 150 will engage the conductive pins 145 and 148 as indicated by the phantom line disc $150_{12}$. When the target 124 is oriented with the cable 137 in the 3 o'clock position, the conductive disc 150 will contact the conductive pins 147 and 148 as indicated by the phantom line disc $150_3$. As noted above, the signals generated by the conductive contact of the disc 150 with a pair of pins 145-148 will uniquely indicate a particular rotational orientation of the target 124. The technician need merely approximately align the target 124 using the bubble levels 140-143 in any convenient order. The data interface subsystem will interpret the order from the signals generated by the conductive disc 150 and will complete the necessary calculations.

Figure 17:
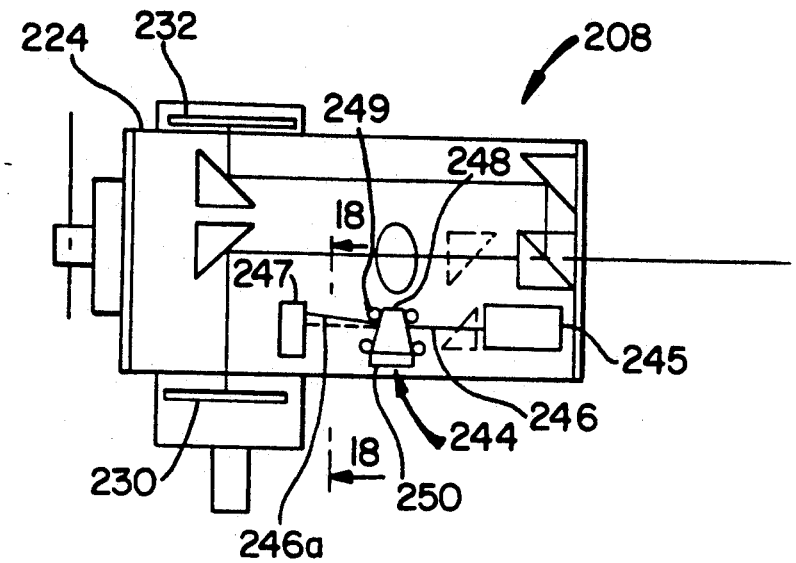
FIG. 17 is a cross-sectional view similar to FIG. 15, but showing a target with an alternate rotational orientation sensing means.
Figure 18:
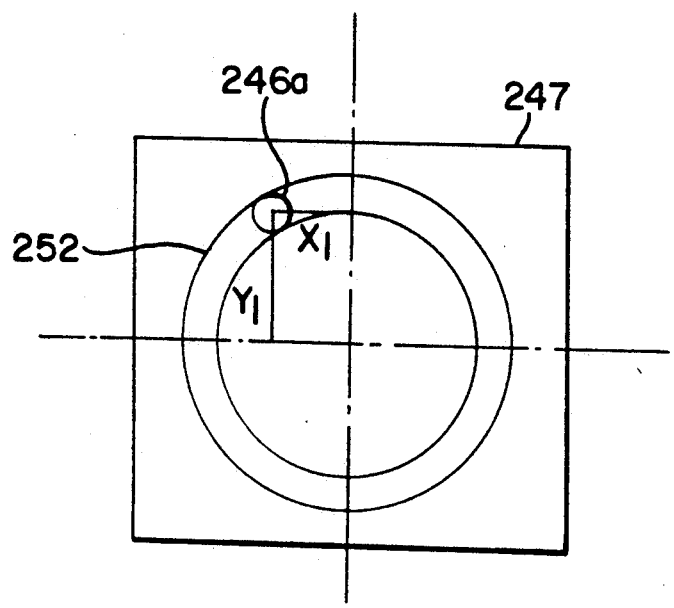
FIG. 18 is a cross-sectional view taken along line 18-18 in FIG. 17.

An alternate rotational orientation subsystem is illustrated in FIGS. 17 and 18. In particular, FIGS. 17 and 18 show a target 208 that is structurally and functionally similar to the target 8 depicted in FIG. 3 and the target 108 depicted in FIGS. 15 and 16. The target 208 is provided with a rotational orientation sensing means identified generally by the numeral 244 in FIG. 17. The rotational orientation sensing means 244 includes a laser source 245 operative to generate a laser beam 246 substantially parallel to the rotational axis of the target 208. The rotational orientation sensing means 244 further includes a photosensitive target 247 mounted in the housing 224 of the target 208 in a position to be impinged upon by the laser beam 246. A prismatic wedge 248 is rotationally mounted on bearings 249 intermediate the laser source 245 and the target 247. The prismatic wedge 248 is operative to divert the laser beam 246 from its initial path into a specified path 246a at an angular alignment to the incoming laser beam 246.

The prismatic wedge 248 includes a weight 250 on one side. The combination of the weight 250 and the bearings 24 causes the prismatic wedge 248 to assume a substantially constant gravitational orientation despite rotations of the target housing 224. In particular, as the target housing 224 is rotated in a machine tool or master part about the central axis of the target, the weight 250 will cause the prismatic wedge 248 to rotate in its bearings 249 such that the weight is always in a gravitationally downward position. As a result, the diverted laser beam 246a will transcribe an annulus 252 on the target 247 as depicted in FIG. 18. At each orientation of the target, the laser beam 246a will define a unique set of x-y coordinates on the target 247 corresponding to the particular angular orientation of the housing 224. As noted above, the target 247 is operatively connected to the data interface subsystem described and illustrated above. The data interface subsystem is operative to convert the x-y coordinates of the reading by the target 247 into a corresponding rotational orientation of the housing 224. Thus, at any instant when readings on the targets 230 and 232 are taken, the data interface subsystem will have received signals from the target 247 defining the precise rotational orientation of the target housing. Thus, the target 208 goes beyond the capabilities of the target 108 described above in providing precise rotational orientation data without the need to manually level the target 208. Furthermore, the target 208 is able to produce plural rotationally distinct readings in situations where the preferred 12, 3, 6 and 9 o'clock readings can not be taken due to interference of adjacent structures.

Although preferred embodiments of the invention have been shown herein, numerous other embodiments within the scope of the appended claims will readily occur to those skilled in the relevant technical art. For example, rotational orientation sensing means other than those depicting herein may be employed. In particular, systems with more then four conductive pins may be provided to yield greater accuracy as to the particular rotational orientation of the target or laser. Furthermore, conductive means other then a disc or washer may be employed, such as a conductive fluid. In embodiments using a prismatic wedge or like means for diverting an incoming laser beam, it may not be necessary to employ a separate and distinct lasing source. In particular, additional beam splitters may be employed to divert portions of the primary incoming laser beam into the prismatic wedge or other rotationally mounted beam diverting means. Additionally, the rotational orientation sensing means may be incorporated into the laser emitter instead of or in addition to the target.

What is claimed is:

1. A control system for aligning an operating member to a part comprising:
   a laser means for generating a laser beam, said laser means being removably mountable to a selected one of said operating member and said part;
   a photosensitive target capable of generating signals identifying locations at which the laser beam impinges thereon, said photosensitive target being removably mountable in a selected one of the operating member and the part;
   rotational orientation sensing means mounted to a selected one of said laser means and said photosensitive target for generating a signal identifying the rotational orientation of the selected one of the laser means and the photosensitive target to which the rotational orientation sensing means is mounted; and
   computer means operatively connected to said target and said rotational orientation sensing means for calculating alignment data based on the signals generated by the target for each of plural rotational orientations of at least one of said target and said laser means.

2. A control system as in claim 1, wherein the rotational orientation sensing means comprising a plurality of electrically conductive terminals operatively connected to the computer means and rigidly mounted to a selected one of the laser means and the target for rotation therewith, a conductive means disposed intermediate the terminals and being in electrical contact with less then all of the plurality of terminals, said conductive means being dimensioned to move relative to said terminals in response to rotation of the selected one of the laser means and target to which the terminals are mounted, such that the terminals contacted by the conductive means varies with said rotation, whereby the contact of the conductive means with the terminals generates signals indicative of rotational orientation.

3. A control system as in claim 2, wherein the conductive means comprises a disc movable relative to the terminals for rotation into contact with selected ones of said terminals.

4. A control system as in claim 2, wherein the plurality of terminals comprises four terminals, and wherein the conductive means is dimensioned to be in contact with no more then two of said terminals for each possible rotational orientation of the selected one of the laser means and the photosensitive target to which the rotational orientation sensing means is mounted.

5. A control system as in claim 4, wherein the conductive means is a disc gravitationally movable intermediate the four terminals and being dimensioned to contact two of the terminals in response to said rotation.

6. A control system as in claim 1, wherein the rotational orientation sensing means comprises a housing, a second laser means mounted in the housing for generating a second laser beam, a second photosensitive target mounted in the housing and capable of generating signals identifying locations at which the second laser beam impinges thereon, and optical beam diverter disposed intermediate the second laser means and the second photosensitive target and being operative to divert the second laser beam, the beam diverter being rotationally mounted relative to the housing, diverter stabilizing means for preventing rotation of the beam diverter in response to rotation of the housing, such that the second laser beam transcribes an annulus on the target in response to rotation of the housing, and such that each location on the annulus corresponds to a particular rotational orientation of the housing.

7. A control system as in claim 6, wherein the beam diverter is a prismatic wedge.

8. A control system as in claim 6, wherein the diverter stabilizer comprises a weight mounted to a selected side of the beam diverter for gravitationally stabilizing the beam diverter despite rotation of the housing.

9. A control system as in claim 1, wherein the rotational orientation sensing means is mounted to the target.

10. A photosensitive target for a laser alignment control system, said system including computer means operatively connected to the target for receiving electrical signals therefrom, said target comprising a housing, a photocell mounted in the housing and being capable of generating signals identifying locations at which a laser beam impinges thereon, mounting means projecting from said housing for mounting the target in a member for rotation about a rotational axis, and rotational orientation sensing means for generating signals identifying rotational orientation of the housing, said rotational orientation sensing means being connectable with the computer for transmitting signals thereto.

11. A target as in claim 10, wherein the rotational orientation sensing means comprises:
   a plurality of electrically conductive terminals mounted in the target and defining a plane angularly aligned to the rotational axis, a conductive member disposed in the housing intermediate the terminals, the conductive member being dimensioned to contact less than all of the terminals and being movable in response to said rotation, such that the terminals contacted by the conductive member varies in accordance with the rotational orientation of the housing, whereby the terminals contacted by the conductive members generate signals identifying the rotational orientation of the housing.

12. A target as in claim 11, wherein the plurality of terminals comprises four terminals, and wherein the conductive means is dimensioned to contact no more than two of said terminals.

13. A target as in claim wherein the conductive member defines a conductive disc.

14. A target as in claim 10, wherein the rotational orientation sensing means comprises a second laser means rigidly mounted in the target for generating a second laser beam, a second photosensitive target rigidly mounted in the target and capable of generating signals identifying locations at which the second laser beam impinges thereon, a beam diverter rotatably mounted intermediate the second laser means and the second photosensitive target for diverting the second laser beam, and stabilizing means for preventing rotation of the beam diverter with rotation of the target, whereby rotation of the target causes the second laser beam to transcribe an annulus on the second photosensitive target, with each location on the annulus defining a particular rotational orientation of the photosensitive target.

15. A rotational orientation sensor for a laser control system for aligning an operating member to a part, said control system including a first laser means for generating a first laser beam, said first laser means being mountable in a selected one of said operated member and said part, photosensitive target capable of generating signals identifying locations at which the first laser beam impinges thereon, said photosensitive target being mountable in a selected one of the operating member and the part, computer means operatively connected to said target for calculating alignment data based on the signals generated by the target, a selected one of the first laser means and the photosensitive target defining a rotatable component for generating signals at each of a plurality of different rotational orientations, the rotational orientation sensing means being mounted to the rotatable component and including:

a second laser means rigidly mounted in the rotatable component for generating a second laser beam;

a second photosensitive target rigidly mounted in the rotatable component and capable of generating signals identifying locations at which the second laser beam impinges thereon;

a beam diverter rotatably mounted intermediate the second laser means and the second photosensitive target for diverting the second laser beam; and stabilizing means for preventing rotation of the beam diverter in response to rotation of the rotating component, whereby rotation of the rotatable component causes the second laser beam to transcribe an annulus on the second photosensitive target, with each location on the annulus defining a particular rotational orientation of the photosensitive target.

16. A rotational orientation sensor as in claim 15, wherein the beam diverter comprises a prismatic wedge.

17. A rotational orientation sensor as in claim 15, wherein the stabilizer comprises a weight rigidly mounted to the beam diverter.

18. A rotational orientation sensor as in claim 15, wherein the rotatable component is the photosensitive target, the photosensitive target comprising a housing, the rotational orientation sensing means being mounted in the housing of the photosensitive target.

19. A rotational orientation sensor as in claim 15, wherein the second laser means comprises a beam splitter for diverting a portion of the first laser beam, the diverted portion of the first laser beam defining the second laser beam.

20. A rotational orientation sensor comprising a rotatable housing, a laser means mounted in the rotatable housing for generating a laser beam, a photosensitive target mounted in the housing and capable of generating signals identifying locations at which the laser beam impinges thereon, a beam diverter rotatably mounted intermediate the laser means and the photosensitive target for diverting the laser beam, and stabilizing means for preventing rotation of the beam diverter in response to rotation of the housing, whereby rotation of the housing causes the laser beam to transcribe an annulus on the photosensitive target, such that each location on the annulus defining a particular rotational orientation of the housing.

* * * * *